Patented Aug. 11, 1925.

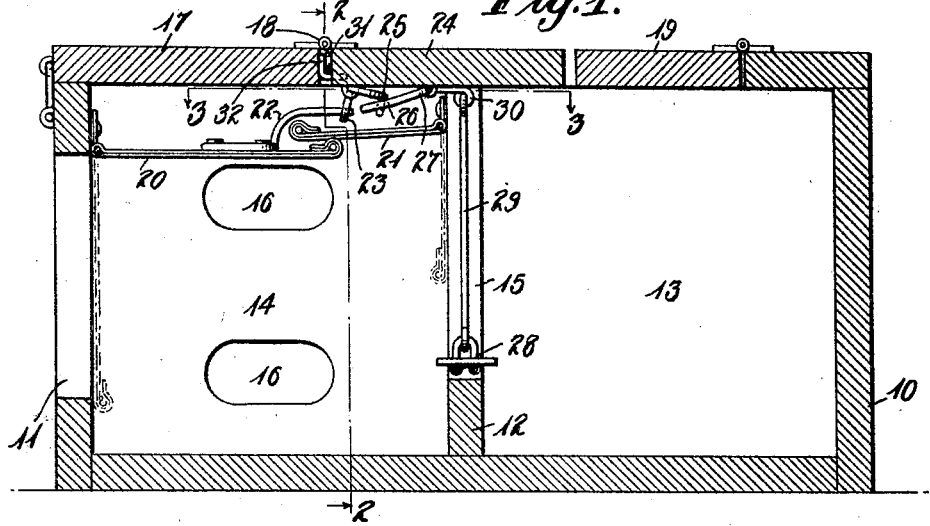

1,549,391

UNITED STATES PATENT OFFICE.

EDWIN O. STEWART, OF HALLTOWN, MISSOURI.

TRAP NEST.

Application filed October 26, 1923. Serial No. 670,946.

*To all whom it may concern:*

Be it known that I, EDWIN O. STEWART, a citizen of the United States, residing at Halltown, in the county of Lawrence and State of Missouri, have invented certain new and useful Improvements in Trap Nests, of which the following is a specification.

The present invention relates to a trap nest for entrapping hens and is particularly designed with means for keeping the hen and egg in separate compartments.

An object of the invention is to provide a trap nest operating automatically upon the entrance of a hen into the nesting compartment to prevent the exit of the hen from the trap although permitting the hen to pass out of the nesting compartment and into an ante-chamber from which it may be subsequently released.

A further object of the invention is to provide a trap nest of generally improved construction and design embodying separate communicating chambers or compartments having closures and automatic closure-operator for causing the simultaneous closing of both compartments.

Various other objects and advantages of the invention may become apparent from the following description considered in connection with the accompanying drawings, wherein:

Figure 1 is a longitudinal sectional view of the said trap nest.

Figure 2 is a transverse sectional view taken on line 2—2 of Figure 1, and

Figure 3 is a horizontal sectional view along line 3—3 of Figure 1.

This improved nest comprises a rectangular box like structure 10 having an entrance opening 11 at one end and a centrally disposed vertical partition 12 dividing the interior of the box into a nesting chamber 13 and a ante-chamber 14, the latter being at the entrance end of the box and in communication with the nesting chamber thru opening 15 of the partition. Elongated openings 16 may also be provided in each side wall of the ante-chamber for purpose of light and ventilation in addition to providing hand holes thru which the fingers may be inserted in a manner for manipulating the closure members in setting or resetting the device. Access to the ante-chamber is obtained by means of an opening in the top of the box which is normally closed by a hinged cover 17 fastened in place as shown at 18. Access is obtained to the interior of the nesting chamber by means of the door 19.

Covering the entrance opening 11 on the inside of the box is a hinged closure member 20, while a smaller closure member 21 is arranged to partly cover the opening 15 in the partition, being similarly arranged on the inside of the ante-chamber as shown. These closure members are of such relative construction that when both are swung outwardly into substantially horizontal position, the forward edge of member 20 engages under and supports member 21. To hold the members in this partition and to thus open the nest, a catch 22 is provided on the top side of closure 20 to be engaged with a hinged U-shaped bracket 23 pivotally supported in hangers on the underside of the top strip 24 of the box. This bracket may be formed of a wire rod as illustrated and has one end extended and bent upon itself to provide a loop 25 with which engages the trigger end 26 of the trip lever 27. Bracket 23 engages catch 22 only when it is tilted upwardly from its normal vertical position, such motion on its part causing the trip lever to be so rocked in its bearing as to slightly elevate the pedal 28 which extends across the bottom of opening 15 of the partition. This pedal is pivotally mounted at one end and has its other end connected to the lower terminal of a rod 29 by means of which it is connected to the crank end 30 of the triger rod 27.

In practice, when closure members 20 and 21 are held in open position by reason of the engagement of catch 22 with the catch-bracket 23, the trap nest is open and the hen may enter ante-chamber 14 thru the entrance 11, and may pass into nesting chamber 13. However, in passing thru opening 15 the hen will depress pedal 28, rocking trigger lever 27 and causing the catch bracket 23 to disengage catch 22. This releases the closure members 20 and 21 which immediately swing downwardly over openings 11 and 15 respectively. The trap is thus closed but the hen may pass out of the nesting chamber 13 and into the ante-chamber 14 since closure member 21 swings outwardly in the direction of the latter chamber. After having passed into the ante-chamber the return of the hen to the nesting compartment is prevented by the falling back of the closure member 21 into position. Thus the egg and the hen are kept in separate compartments of the nest. The hen may be subsequently released from the nest by opening either of the doors 17 and 20 and the egg may be removed by opening door 19.

To hold closure members 20 and 21 and to permit entrance or exit of a hen in the nest without causing operation of the trigger mechanism a hook 31 is pivoted to top strip 24 forwardly of the catch bracket 23, and may be moved into engagement with catch 22 for preventing door 22 from dropping when the catch-bracket is disengaged therefrom.

From the foregoing it is thought that the advantages and novel features of the invention can be readily understood and that further detail description thereof is not required.

What is claimed is:

A trap nest comprising a front compartment and a rear compartment, an opening in the front wall of the front compartment, a pivot door for said opening, an opening in the wall between both compartments, a pivoted door for said latter opening, a catch on said first mentioned door adapted to engage a looped bracket hinged to the top wall of the front compartment for holding both doors in open position, a treadle disposed in the opening between the compartments having a trigger engaging said looped bracket adapted to release said bracket from said catch to cause both doors to close simultaneously when the treadle is depressed by a hen passing from the front compartment to the rear compartment, a hook on the top wall of the front compartment adapted to engage said catch to prevent both doors from closing when desired, said second mentioned door being adapted to be swung outwardly from its closed position by a hen leaving the rear compartment to allow the hen to enter the first compartment to be trapped in said front compartment, and a door in the top of each compartment.

In testimony whereof I affix my signature.

EDWIN O. STEWART.